2,901,401

MALTING PROCESS

Phyllis W. Grimm, Brookfield, and Dwight L. Baker, Milwaukee, Wis., assignors to Basic Products Corporation, a corporation of Wisconsin Application June 21, 1957, Serial No. 667,039

11 Claims. (Cl. 195—71)

This invention relates to malting and it more specifically resides in treating the grain with formaldehyde to modify germination and thereby enhance certain desired characteristics sought in a malt.

A primary endeavor of malting is to subject grain to controlled germinating conditions for limiting growth while permitting development of enzyme activity. Temperature, air movement through the grain, and presence of moisture are carefully regulated to achieve desired results, and these controlled conditions will be varied, depending upon specifications set for the finished malt and the particular grain being malted. It is particularly desirable to restrict rootlet growth to retain the endosperm materials within the berry, and to accomplish a uniform modification of the endosperm. To gain this purpose, the present invention introduces to the malting process a formaldehyde treatment of the grain. Germinating conditions are then controlled by the use of the formaldehyde to achieve an increased yield of modified endosperm, while retaining comparable enzyme development. Further, rootlet growth is sharply curtailed, with a marked contrast from growth heretofore experienced.

Particular advantages flow from the curtailment of rootlet growth, in addition to enhanced berry size and increased yield of finished malt. The interwoven entanglement of growing roots, that occurs in the germination compartment, is lessened. Mixing of the grain becomes easier and may be more quickly accomplished. Danger of injury to the developing malt is thereby lessened, and also a germinating compartment may be unloaded in a shorter time period.

It is a further discovery of this invention that the inclusion of a formaldehyde treatment in the malting process, to affect germination, will advantageously lighten a brewer's wort color and finished beer color. With the light colored beers finding popular acceptance, there has been an effort to lighten beer color, and a malt that accomplishes further lightening is highly favored for brewing purposes. The ability to achieve lighter wort and beer color gives another additional advantage. Greater flexibility in the selection of kilning temperatures may be had, since additional heat may be imparted to the green malt without causing a beer to be produced therefrom to darken beyond that from malts heretofore produced. The higher kiln-off temperatures impart desirable flavor and body to a beer by developing aromatic products in the malt, and hence are desirable for achieving a quality beverage.

It has also been recognized that it is desirable to produce lighter colored malts, and it is common that brewers will select malts with brighter hulls as a premium ingredient for a mash. It is a further teaching of the invention to inhibit the hull darkening which normally occurs during germination, through the presence of controlled formaldehyde that modifies the malting process. Enhanced hull brightness of a lasting quality is then obtained, as contrasted with the hull color of malt processed in the absence of formaldehyde. The hull darkening, that has heretofore taken place in malting, is substantial and is a development that regularly occurs during germination. This darkening has been commonly accepted as a normal change that may only be overcome by additional treatment such as bleaching during kilning. It is a teaching herein that darkening may be inhibited in a manner that lends itself to commercial production and to a degree that eliminates a bleach.

To achieve the foregoing results the malting process is modified by introducing a formaldehyde solution to the grain at a time in the process that affects the germinating period. The formaldehyde supplement may be introduced in advance of, or during, the transfer of the grain to the place of germination. For example, the terminal periods of steeping can consist of a formaldehyde soak. The formaldehyde may also first be added soon after transfer to the place of germination. Subsequent treatment should also be made later in the germination stage to derive full benefits. We are aware that formaldehyde, like other disinfectants, has been investigated in steeping for the purpose of destroying bacteria and moulds, but it has only been suggested as a treatment for grain subject to microbial contamination. No one to our knowledge has used it for brightening the malt of normal barleys and increasing berry size and yield, without impairing the resultant malt and its diastatic power, or the germinating energy of the grain. Use of formaldehyde as a disinfectant could not be predicated to beneficially affect the malt of a normal, healthy grain as to either color or yield, but only to prevent impairment by bacteria and the like, as in the instance of other disinfectants. The expected result of a disinfectant is very different from the results we obtain.

It is an object of this invention to provide an economical malting process that increases malt brightness which is adapted for commercial production.

It is another object of this invention to provide a malt of increased berry size.

It is another object of this invention to provide an increase in the yield of malt from a given amount of initial grain.

It is another object of this invention to provide a process of malting in which rootlet growth is inhibited, but wherein enzyme development and modification of the endosperm are not detrimentally curtailed.

It is another object of this invention to provide a malt that will produce both a lighter brewery wort and a lighter finished beer.

It is another object of this invention to utilize formaldehyde, as an agent to enhance malt characteristics, in a process in which formaldehyde residue is negligible.

It is another object of this invention to provide a malt from which a beer may be produced that has desirable stability characteristics.

It is another object of this invention to provide a malt which permits for greater latitude in the amount of soluble nitrogen present in a wort produced therefrom, without adversely affecting other malt qualities.

The foregoing and other objects and advantages of the invention will appear from the description to follow. In the description particular means for carrying out the invention are set forth and accompanying the description is a drawing comprising graphs that portray particular test results that illustrate the use of formaldehyde in the germination of malt. Such means and the drawing are not presented by way of limitation, but are set forth as illustrative examples of practice of the invention.

Figure 1:
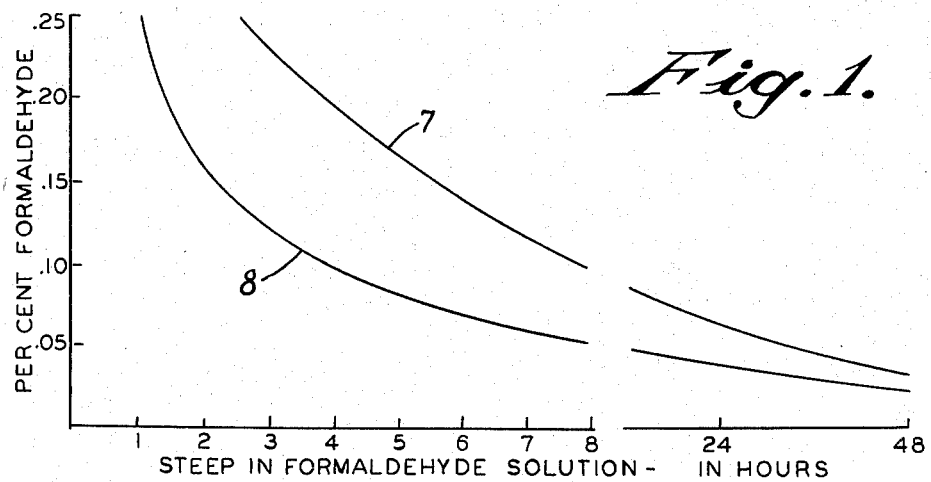
Fig. 1 is a graph showing the effects of strength of formaldehyde and duration of application during the terminal hours of the steep upon barley germination energy and capacity.

After cleansing, the grain selected for the malt is first subjected to a steep comparable to that of accepted malting practices. The moisture content during the steep is usually increased to about 40 to 50 percent in commercial malting, and the soak may last upwardly to three days. Water temperature is commonly held between 45 to 65 degrees F., and water change is frequent. Either periodic drainage and refilling, or continual addition of water, with accompanying drain off, may be employed, and the particular conditions of the steep are largely determined by the grain itself. Grain size, hull thickness, growing conditions and type of grain are each a factor that must be accounted for, and as in malting heretofore practiced wide latitude in the manner of raising moisture content within the grain is a matter of course. The grain selected, if for brewing purposes, will usually be a barley, but other grains may also be malted in the manner herein described.

Steeping may be carried out in the usual steep tanks of cylindrical form with conical bottom, and in one particular practice grain is first introduced into an upper of a pair of tanks in an amount of approximately 2500 bushels. After a 24 hour period in the tank it is removed through the conical bottom to an identical lower tank, for an additional 24 hour steep treatment. During the latter hours of the steep formaldehyde may be added to the steep water as a preliminary conditioning for germination. The formaldehyde thereby associates with the grain to affect germination and thereby modify growth development. A final four hour steep in a .05 percent formaldehyde solution has been found to be a desirable treatment preliminary to removal to germinating compartments, particularly when coupled with a subsequent formaldehyde solution watering during the germination stage.

For germination the grain is preferably transferred to drums or compartments, as in usual commercial malting, or if desired floor malting may be carried out. Cool, fresh, moist air is supplied to the steeped grain for providing oxygen required in respiration, and for dissipating heat evolved in the living processes. Temperatures are carefully controlled, and as in usual malting the range of 50 to 60 degrees F. is typical of the process. The length of the germination period may also vary as in usual malting, and five days is exemplary of practices in this country. Individual grain characteristics, as well as results to be achieved, determine particular germinating conditions, and the teachings herein are to be employed in a flexible manner consistent with malting practices suitable for the particular grain selected. It is to be understood that the practice of malting need not be altered, in carrying out the invention, except for the changes as are stated herein, which relate to treatment with formaldehyde. The invention superimposes this treatment upon exising malting procedures.

The introduction of formaldehyde modifies the malting process by affecting growth and physiological processes during germination. To this end formaldehyde may be introduced in the latter steeps, as already described, or as alternatives, an initial introduction to the grain may be in the form of a wash or watering as the steeped grain is transferred from the steep tanks to the germinating compartments, or immediately after transfer to the germinating compartments. In addition to such initial treatment, which is primarily effective in early germination, subsequent watering with formaldehyde solution during the germination period should also be undertaken. For example, when a four hour final steep with .05 percent solution is employed, an additional watering spray at the end of the second day of germination with a .1 percent formaldehyde solution has been found to be highly satisfactory for developing benefits of the invention. The amount of watering during germination, as in usual malting, is determined in part by the particular grain being malted, the nature of the equipment employed, and the practices of the particular maltster. Hence, these factors may influence the amount and concentration of the formaldehyde solution. In the example illustrated, of a .1 percent solution watering spray at the end of the second day of germination, approximately one gallon of solution was used to the bushel and two passes over the germinating bed were made with the spray.

After germination in the compartment has proceeded to the desired degree the green malt is transferred to kilns and heated for both drying and terminating growth, in conformity with accepted malting practices. Separation from any remaining attached rootlets and cleaning follows to produce the finished malt.

Tests have demonstrated that there is an absence of any free formaldehyde on the finished malt, and that if remaining condensation products be translated into formaldehyde the amount would be less than that which naturally occurs free and uncombined in many foods. Wholesomeness of the malt is thus maintained in the practice of the invention. The tests conducted included radioactive carbon tracer analysis of a malting process having a .05 percent formaldehyde solution soak for the final four hours of steep and a watering with a .05 percent formaldehyde solution during germination. Only one-tenth the amount of formaldehyde taken by the grain from the solutions remained with the finished malt, and by phenylhydrazine tests for free formaldehyde this was shown to be in the form of condensation products. Further, even if it be assumed that all radioactive carbon present on the finished malt to be in the form of free formaldehyde, then the tracer tests demonstrated that the presence is only .006 percent by weight of malt. The tracer tests further included the manufacture of beer from malt of the invention. Results indicated that if the radioactive carbon in the finished beer be calculated as residing in formaldehyde, although it is not, then there would be less than two parts per million of formaldehyde.

The ability of the finished malt to convert starches to sugars is not impaired, for diastatic power and the presence of alpha amylase remain at desirable levels. Also, the finished malt may be expected to exhibit greater berry size, as contrasted with malt processed in the absence of formaldehyde. There is a marked reduction in rootlet growth, and the yield of malt for a given quantity of grain is advantageously increased. The increase in yield is significantly demonstrated by the typical test results set forth in Table I, below. The malting for each of the eight experiments included: (1) the production of an untreated control malt, and (2) the production of a treated malt, that is, produced in accordance with the invention, that had a .05 percent formaldehyde solution soak for a final four hour steep and a subsequent watering with a .05 percent formaldehyde solution during germination. The grain size "A," indicated in the table, designates large size kernels, and the designation "B" refers to a medium size kernel. For the eight tests set forth the average increase in yield, as expressed in treated malt as percent of untreated control malt, is 103.3 percent.

Table I

| Exp. No. | Barley | | Yield in Lbs. per 10 Lbs. of Original Grain | | |
|---|---|---|---|---|---|
| | Variety | Size | Untreated Control Malt | Treated Malt | Treated Malt as Percent of Untreated Malt |
| 1 | Kindred | B | 8.125 | 8,438 | 103.9 |
| 2 | do | B | 8.188 | 8.438 | 103.1 |
| 3 | do | A | 8.190 | 8.560 | 104.5 |
| 4 | do | A | 8.500 | 8,690 | 102.2 |
| 5 | do | A | 8.380 | 8.750 | 104.4 |
| 6 | do | A | 8.440 | 8.750 | 103.7 |
| 7 | Montcalm | A | 8.125 | 8.313 | 102.3 |
| 8 | do | A | 8.440 | 8.630 | 102.3 |

The increase in berry size is verified by the test results set forth in Table II. For each of the eight experiments listed there is given the percent, by weight, of kernels that are retained on a 7/64 inch slotted screen of a Richmond grader, for both an untreated control malt and a malt produced under the invention. For each experiment, the malt of the invention was treated by a four hour final steep in a .05 percent formaldehyde solution and a watering during germination with a .05 percent formaldehyde solution. In each experiment the amount of treated malt retained on the screen substantially increased, and there is tabulated the difference between control and treated malts together with the amount of treated malt expressed as percent of control malt.

Table II

| Exp. No. | Percent by Weight Retained on 7/64" Screen | | Difference | Treated Malt as Percent of Control Malt |
|---|---|---|---|---|
| | Untreated Control Malt | Treated Malt | | |
| 1 | 24.7 | 31.4 | +6.7 | 127 |
| 2 | 34.7 | 53.0 | +18.3 | 153 |
| 3 | 37.9 | 54.6 | +16.7 | 144 |
| 4 | 46.8 | 64.1 | +17.3 | 137 |
| 5 | 27.1 | 38.3 | +11.2 | 141 |
| 6 | 22.3 | 38.0 | +15.7 | 170 |
| 7 | 24.2 | 34.6 | +10.4 | 143 |
| 8 | 20.3 | 27.4 | +7.1 | 135 |
| Average | 29.8 | 42.7 | +12.9 | 144 |

Of particular benefit is the aspect of producing lighter colored brewery wort and finished beer from malt manufactured in accordance with the invention. As the trend of popular beers runs to lightness of color, malt that enhances this characteristic enables the brewer to provide the consuming public with a more acceptable product. That the increased lightness that is possible from the use of our malt is most significant for this purpose has been shown by test. The color of laboratory wort from malt of the invention measured 1.64 degrees Lovibond, as an average for a group of twelve experiments, as contrasted with an average of 1.97 degrees for wort from untreated control malt. It should be noted that a higher figure in degrees Lovibond represents a darker product. For brewery wort, which is obtained at a different stage in brewing than laboratory wort, the average of eleven tests was 3.48 degrees for wort from treated malt and 4.28 degrees for wort from untreated control malt. For a finished beer, the average of a group of eleven tests was 2.86 degrees for a product from treated malt and 3.40 degrees for a product from untreated control malt. These differences are readily noticed to the eye.

That the malt of the invention is highly desirable for brewery purposes is also borne out by the lack of any detrimental influence on finished beer. No meaningful differences are found in beer characteristics such as alcohol content, degree of fermentation, presence of sugars and dextrins, gas stability, foam index, flavor, odor or taste, nor need the brewing process be altered for beers produced from the malt. In addition, tests indicate that beer stability is frequently enhanced through the use of malt of the invention.

The soluble nitrogen present in the malt of the invention is less than that of other malts produced in a similar fashion, except for an absence of formaldehyde. Hence the amount of soluble nitrogen in a wort produced from the malt may also be decreased. If desired, the soluble nitrogen of the malt may be readily increased in well-known fashion, thus there is an enhanced flexibility, which is of particular value to the maltster who may be called upon to meet a variety of requirements.

Figure 2:
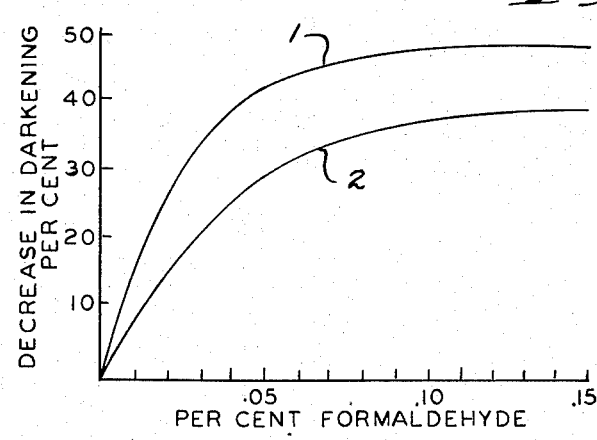
Fig. 2 is a graph showing the relation of strength of formaldehyde to the decrease in the rate of darkening of hulls during malting.

As has been noted, increased hull brightness for a final malt is derived from the formaldehyde treatment by inhibition of the darkening process that occurs in germination. A treatment to be effective at the commencement of germination, such as the described soak in a formaldehyde solution during the terminal hours of the steep, is most important to secure desirably bright hulls. It has been found, however, that the degree of brightening does not correspond directly to the concentration of the formaldehyde, or the length of such a formaldehyde soak. Thus, where the steep includes a formaldehyde soak as a four hour terminal period, concentrations above .1 percent further increase the amount of brightening little, if at all. Unduly extended periods of soak also fail to produce corresponding brightness. Fig. 2 demonstrates the relation of formaldehyde concentration to brightening of the malt. Curve 1 shows the use of formaldehyde in both a terminal steep and watering during germination proper. Curve 2 shows the use of formaldehyde in a terminal steep alone. In each instance concentrations above .1 percent had little additional affect upon decreasing the rate of darkening. Data for these curves was taken at concentrations of .01, .025, .05, .10, .125 and .15 percent. The period for the final steep in formaldehyde was four hours, and for curve 1 watering during germination occurred on the second day.

Figure 3:
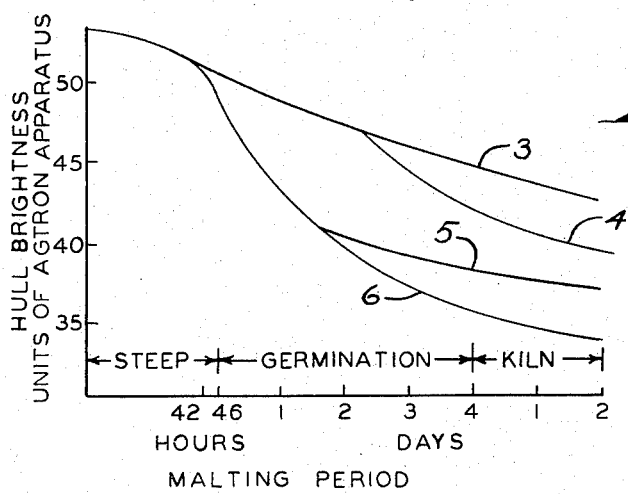
Fig. 3 is another graph showing the effects of formaldehyde on the coloring of malt hulls.

Fig. 2 also indicates that to achieve the full benefits of hull brightening both a preliminary treatment, before or early in exposure to optimum germinating conditions, and continued treatment during the watering of the germination stage should be employed. Thus, while a .1 percent solution may be about the practical maximum concentration for the terminal steep period, brightness of the hulls is also enhanced by continued formaldehyde treatment in the subsequent watering during germination stage. The curves of Fig. 3 further demonstrate the advantage of formaldehyde treatment both in the terminal steep period and in germination. For curve 3 formaldehyde treatment was carried out in the steep period and in germination, for curve 4 treatment was in the steep period alone, for curve 5 treatment was during germination alone, and curve 6 represents a control test without formaldehyde treatment. Hull brightness was measured by an Agtron testing apparatus, in which an ascent in the units of measurement indicates brighter hull color. Where a final formaldehyde steep was employed it was for four hours with a .05 percent solution, and where watering was carried out during germination it was at the second day with a .05 percent solution. The employment of a formaldehyde treatment during germination not only enhances brightening, as indicated by curves 3 and 5 in Fig. 3, but also causes a marked curtailment in further rootlet growth. This enables the endosperm materials to be conserved, and probably contributes to increased malt yield and berry size.

The effect of formaldehyde treatment on brightening is also shown in Table III below. For the twelve experiments listed a formaldehyde treatment was employed both in the steep and in germination proper. Control tests had no formaldehyde and the types of barley employed were Kindred and Montcalm. Brightness was measured by an Agtron apparatus. It is seen that the average magnitude of increase in brightness of malt of the invention, over untreated control malt, was +6.9 units.

*Table III*

| Exp. No. | Barley | | | Malt Color in Agtron Units | | Change in Agtron Units |
|---|---|---|---|---|---|---|
| | Variety | Size | Year | Untreated Control Malt | Treated Malt | |
| 1 | Kindred | A | 1955 | 30.8 | 40.5 | +9.7 |
| 2 | do | A | 1955 | 30.5 | 36.6 | +6.1 |
| 3 | do | A | 1955 | 33.7 | 40.8 | +7.1 |
| 4 | do | A | 1955 | 39.2 | 45.0 | +5.8 |
| 5 | do | A | 1955 | 33.6 | 36.8 | +3.2 |
| 6 | do | A | 1955 | 34.4 | 41.2 | +6.8 |
| 7 | do | A | 1954 | 35.8 | 40.4 | +4.6 |
| 8 | do | A | 1954 | 34.6 | 42.4 | +7.8 |
| 9 | do | B | 1954 | 42.4 | 46.6 | +4.2 |
| 10 | do | B | 1955 | 27.8 | 40.4 | +12.6 |
| 11 | Montcalm | A | 1955 | 23.2 | 31.2 | +8.0 |
| 12 | do | A | 1955 | 22.4 | 29.8 | +7.4 |
| Average | | | | | | +6.9 |

It is recommended that higher concentrations of formaldehyde, particularly preliminary to or in early germination, be avoided, for not only is there no directly corresponding benefit in brightness, but larger dosage may, instead, deleteriously affect the germinating energy and capacity of the grain. As these terms are used herein, germinating energy refers to the vigor with which a grain will germinate, and capacity refers to the ultimate ability to germinate. Exact values of concentration, and duration of soak or sprinkle, at which inhibition of germinating energy and capacity occurs will vary with the conditions and techniques under which the malting is carried out. In usual practice of the invention, however, ranges for concentration and duration of application will be well within limiting values. For example, in a four hour final steep preliminary to placement in germinating compartments, or drums, as the case may be, a .05 percent solution gives highly desirable results, whereas the concentration may be approximately doubled and the benefits of the invention still obtained without adversely affecting a normal commercial malting process.

Both the time of soak and the concentration of the formaldehyde are factors in determining limits for avoiding detrimental inhibition of germination, and for formaldehyde soaks at the termination of the steep period the product of the time of soak and the degree of concentration may be utilized as a factor for determining what such limits may be. As a general guide, for a soak of about one to eight hours the time of soak, measured in hours, times the concentration, measured in percent formaldehyde, should not exceed about the factor of .4. Thus, for example, a .1 percent solution should not be used for greater than about four hours, a two hour final steep should not have a concentration greater than about .2 percent, and for an eight hour steep the concentration should not greatly exceed .05 percent. This general rule is derived from the test results employed in plotting the curves 7 and 8 of Fig. 1. In Fig. 1 terminal hours in formaldehyde steeps and concentration of the solutions employed are represented by the graph axis. For different terminal steeps at different formaldehyde concentrations observations were made of inhibitory effects upon both the capacity to germinate and the inhibition of germinating energy. The data collected indicated that germination capacity began to be impaired to a noticeable degree for conditions along curve 7, and that germinating energy began to be noticeably affected for conditions along curve 8. It is to be recognized, however, that the transition from an absence of inhibitory effects to markedly detrimental effects, which is recognized by an inhibition of substantial quantities of a grain, is not abrupt. Thus, the factor .4 is a useful guide, rather than an indication of an abruptly occurring critical zone. For non-impairment of germinating energy, values below curve 8 ought to be selected, and values for the factor .4 lie in the vicinity of curve 8 for steeps between one to eight hours.

As germination continues, resistance of the kernels to formaldehyde increases, so that greater concentrations may be safely employed. For watering during germination permissive values of concentration accordingly increase. For example, two percent solutions have been used in a spray, in which run off has been minimal, without detrimental effect on germination development within the berries. Sprinkling conditions and the nature of apparatus employed also play a predominant role in determining the upper limits for the amount of formaldehyde that may be employed. The area covered by the spray and the amount of run-off of the solution are two primary factors to be taken into account. However, concentrations used in germination will be below harmful values for economic reasons.

The invention provides the additional control of a formaldehyde treatment for the malting process, which control is unique by enhancing particular desired malt characteristics, while not impairing other desired characteristics by an unwanted upset of the delicately balanced phenomena occurring during germination. It is a control that permits regulation of but certain of the many aspects of early growth, thereby giving the maltster an opportunity to modify malt development. The formaldehyde treatment is preferably introduced near the commencement of germination and again during appropriate moments of subsequent germination, and results of the invention may also in part be obtained by treatment limited to one of these periods.

We claim:

1. The process of malting in which grain is subjected to formaldehyde prior to placement in a germinating environment and is subsequently treated with formaldehyde as germination takes place.

2. The process of malting grain in which the grain is first steeped to increase water content, is then placed in a germinating environment, and is then subjected to drying heat which comprises treating the grain with formaldehyde near the beginning of the period in the germinating environment and subsequently watering the grain with formaldehyde during germination while it is in the germinating environment.

3. The process of claim 2 wherein the grain is barley.

4. The process of malting grain comprising steeping, germinating and kilning, wherein the grain is subjected to the presence of formaldehyde during germination.

5. The process of malting grain wherein watering during germination includes treating the grain with a formaldehyde solution.

6. The process of claim 5 in which the concentration of the formaldehyde in the solution is not in excess of two percent.

7. The porcess of malting grain in which a terminal steep period comprises a soak in formaldehyde solution, the grain is then exposed to germinating conditions that include watering with a formaldehyde solution, and the germinated grain is then dried.

8. The process of claim 7 wherein a terminal steep of four hours in a .05 percent formaldehyde solution is employed.

9. The process of claim 7 wherein the terminal steep is for less than eight hours and the time in hours and the concentration in percent are such that the product of these two factors is not greater than .4.

10. The process of claim 7 wherein the concentration of formaldehyde for watering during germination is not greater than two percent.

11. The process of claim 7 wherein the concentration of formaldehyde in the solution for the terminal steep is not greater than .1 percent.

References Cited in the file of this patent

UNITED STATES PATENTS

| | | |
|---|---|---|
| 1,153,640 | Pollak | Sept. 14, 1915 |
| 1,914,244 | Dixon | June 13, 1933 |

OTHER REFERENCES

Wahl-Henius: American Handybook of the Brewing, Malting and Auxiliary Trades, vol. 2, 3d ed., 1908, p. 1348.

Lampe: Zeitschrift für Speritusindustrie, 51, 1928, pp. 343–4.

Hopkins et al.: Biochemistry Applied to Malting and Brewing, 1937, George Allen & Unwin Ltd., London, p. 129.

Urquhart: Journal of The Institute of Brewing, 59, 1953, pp. 56–58.